United States Patent
Natsui et al.

(10) Patent No.: US 10,230,104 B2
(45) Date of Patent: *Mar. 12, 2019

(54) CATHODE ACTIVE MATERIAL AND BATTERY

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 235 days.

This patent is subject to a terminal disclaimer.

(21) Appl. No.: 15/160,016

(22) Filed: May 20, 2016

(65) Prior Publication Data

US 2016/0365575 A1   Dec. 15, 2016

(30) Foreign Application Priority Data

Jun. 11, 2015   (JP) ................................. 2015-117975

(51) Int. Cl.

| | |
|---|---|
| *H01M 4/505* | (2010.01) |
| *C01G 45/12* | (2006.01) |
| *H01M 4/525* | (2010.01) |
| *H01M 4/04* | (2006.01) |
| *H01M 10/052* | (2010.01) |

(52) U.S. Cl.
CPC ........ *H01M 4/505* (2013.01); *C01G 45/1285* (2013.01); *C01P 2002/72* (2013.01); *C01P 2006/80* (2013.01); *H01M 4/0404* (2013.01); *H01M 4/525* (2013.01); *H01M 10/052* (2013.01); *H01M 2300/004* (2013.01)

(58) Field of Classification Search
CPC .... H01M 4/505; H01M 4/525; H01M 4/0404; H01M 10/052; H01M 2004/028; C01G 45/1285; C01P 2002/72; C01P 2006/80

See application file for complete search history.

(56) References Cited

U.S. PATENT DOCUMENTS 9,893,356 B2 *   2/2018   Natsui ................... H01M 4/505

FOREIGN PATENT DOCUMENTS

JP   2012-204281   10/2012

OTHER PUBLICATIONS

Han et al. "The effects of sodium additive on Li1.17Ni0.10Co0.10Mn0.63O2 for a lithium ion batteries".; Journal of Alloys and Compound, vol. 618, Jan. 5, 2015, pp. 629-634.*

* cited by examiner

*Primary Examiner* — Laura Weiner

(74) *Attorney, Agent, or Firm* — Greenblum & Bernstein, P.L.C.

(57) ABSTRACT

A cathode active material contains a compound represented by composition formula (1): $Li_xNa_y\{Li_\alpha Na_\beta Mn_{(1-\alpha-\beta-z)}A_z\}O_2$. In the formula, A represents at least one selected from the group consisting of Co, Ni, Fe, and Al, and the following conditions are met: $0.75 \leq x \leq 1.0$, $0 < y \leq 0.01$, $0.75 < x+y \leq 1$, $0.16 \leq \alpha \leq 0.3$, $0 < \beta \leq 0.01$, $0.2 \leq \alpha+\beta \leq 0.3$, and $0 \leq z \leq 0.15$.

11 Claims, 1 Drawing Sheet

CATHODE ACTIVE MATERIAL AND BATTERY

BACKGROUND

1. Technical Field

The present disclosure relates to a cathode active material for batteries and to a battery.

2. Description of the Related Art

Japanese Unexamined Patent Application Publication No. 2012-204281 discloses a composite metal oxide that contains an oxide represented by a formula $Li_x\{(Li_yMn_{1-y})_zM_{1-z}\}O_2$ and has the $O_2$ structure. The publication states that in the formula, x is more than 2/3 and less than 1, y is more than 0 and less than 1/3, z is 0.2 or more and 1 or less, and M represents at least one selected from the group consisting of Mn, Co, and Ni.

SUMMARY

In the related art, there is a need for high-capacity batteries.

In one general aspect, the techniques disclosed here feature a cathode active material. The cathode active material contains a compound represented by composition formula (1): $Li_xNa_y\{Li_\alpha Na_\beta Mn_{(1-\alpha-\beta-z)}A_z\}O_2$ ... (1). In the formula, A represents at least one selected from the group consisting of Co, Ni, Fe, and Al, and the following conditions are met: $0.75 \leq x \leq 1.0$, $0 < y \leq 0.01$, $0.75 < x+y \leq 1$, $0.16 \leq \alpha \leq 0.3$, $0 < \beta \leq 0.01$, $0.2 < \alpha+\beta \leq 0.3$, and $0 \leq z \leq 0.15$. In one general aspect, the techniques disclosed here feature a battery including a cathode containing the above-mentioned cathode active material, an anode, and an electrolyte.

The present disclosure provides a high-capacity battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
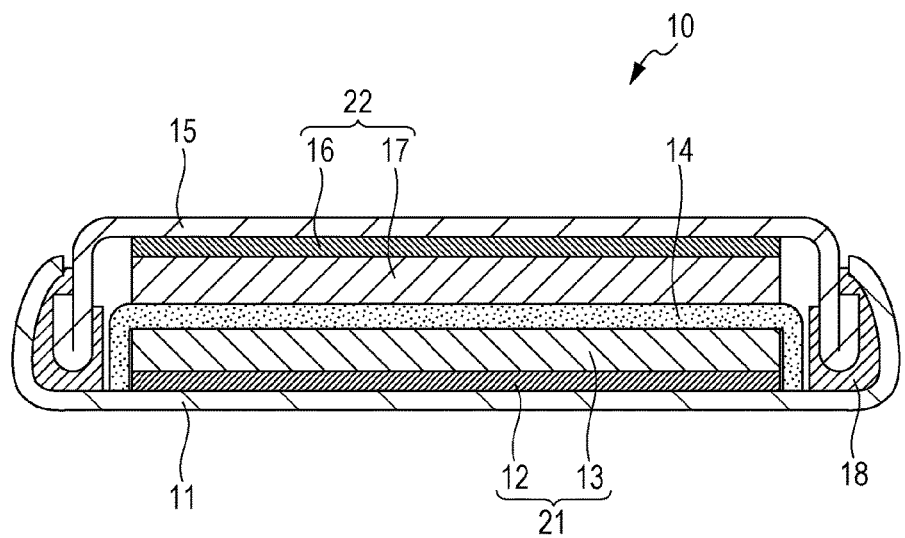
FIG. 1 is a cross-sectional diagram that illustrates a schematic configuration of a battery as an example of a battery according to Embodiment 2.

The following describes some embodiments of the present disclosure.

Embodiment 1

A cathode active material according to Embodiment 1 contains a compound represented by composition formula (1).

$$Li_xNa_y\{Li_\alpha Na_\beta Mn_{(1-\alpha-\beta-z)}A_z\}O_2 \quad (1)$$

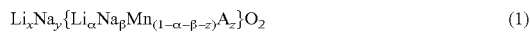

In formula (1), A represents at least one selected from the group consisting of Co, Ni, Fe, and Al.

In the cathode active material according to Embodiment 1, the compound has a composition formula (1) in which the following conditions are met:
$0.75 \leq x \leq 1.0$;
$0 < y \leq 0.01$;
$0.75 < x+y \leq 1$;
$0.16 \leq \alpha \leq 0.3$;
$0 < \beta \leq 0.01$;
$0.2 < \alpha+\beta \leq 0.3$; and
$0 \leq z \leq 0.15$.

This configuration provides a high-capacity battery.

A lithium-ion battery, for example, that uses a cathode active material containing such a compound has a redox potential (vs. $L/Li^+$) of approximately 3.3 V. Its capacity is approximately 264 mAh/g or more.

When x in composition formula (1) is less than 0.75, the availability of Li in the compound is low. In such a case, the capacity is insufficient.

When x in composition formula (1) is more than 1.0, as described later, the compound contains little Li at the site of Mn and does not undergo the redox reaction of oxygen. In such a case, the capacity is insufficient.

When y in composition formula (1) is 0, the compound is structurally unstable. In such a case, cycle characteristics are insufficient.

When y in composition formula (1) is more than 0.01, the diffusion of Li from the compound is inhibited. In such a case, battery characteristics are insufficient.

When x+y in composition formula (1) is 0.75 or less, the availability of Li in the compound is low. In such a case, the capacity is insufficient.

When x+y in composition formula (1) is more than 1, the compound does not undergo the redox reaction of oxygen. In such a case, the capacity is insufficient.

When $\alpha$ in composition formula (1) is less than 0.16, the compound has a structure more similar to $LiMnO_2$ than to $Li_2MnO_3$ and thus undergoes only ineffective redox reaction of oxygen. Furthermore, the Li content of the transition metal layer is low. As a result, the capacity is reduced.

When $\alpha$ in composition formula (1) is more than 0.3, the compound contains increased amounts of impurities. In such a case, the efficiency in initial charge and discharge processes is reduced, and the capacity is insufficient.

When $\beta$ in composition formula (1) is 0, the compound is structurally unstable. In such a case, cycle characteristics are insufficient.

When $\beta$ in composition formula (1) is more than 0.01, the diffusion of Li from the compound is inhibited. In such a case, battery characteristics are insufficient.

When $\alpha+\beta$ in composition formula (1) is less than 0.2, the compound does not undergo the redox reaction of oxygen. In such a case, the capacity is insufficient.

When the compound has a composition formula (1) in which $\alpha+\beta$ is more than 0.3, the efficiency in initial charge and discharge processes is reduced. In such a case, the capacity is insufficient.

In the cathode active material according to Embodiment 1, the compound represented by composition formula (1) has a crystal structure that belongs to space group C2/m.

The ratio of Li to Mn in composition formula (1) is represented by $\{Li_{(x+\alpha)}/Mn_{(1-\alpha-\beta)}\}$.

In this formula, $0.91 \leq x+\alpha \leq 1.3$, and $0.7$ $(1-\alpha-\beta)$ $0.84$.

The ratio of Li to Mn therefore theoretically meets the following condition: $1.18 \leq \{Li_{(x+\alpha)}/Mn_{(1-\alpha-\beta)}\} \leq 1.86$. The ratio of Li to Mn is greater than 1.

This means that the number of Li atoms per Mn atom in the compound is greater than that in, for example, $LiMnO_2$, a known cathode active material.

$Li_\alpha Na_\beta$, indicated in parentheses in composition formula (1), is considered located at the same site as Mn.

The Li located at the site of Mn can be removed from or inserted into the site of Mn, accompanied by the oxidation and reduction of oxygen.

The compound represented by composition formula (1) therefore allows more Li per Mn atom to be inserted thereto and removed therefrom than, for example, $LiMnO_2$, a known cathode active material.

In other words, the compound of composition formula (1) has a structure into which Li can be easily inserted and from which Li can be easily removed.

As a result, the cathode active material according to Embodiment 1 is suitable for providing a high-capacity lithium-ion battery.

The compound of composition formula (1) can be synthesized by, for example, providing $Na_4Mn_2O_5$ as a precursor and replacing Na in this precursor with Li in a lithium-containing molten salt.

$Na_4Mn_2O_5$ has a crystal structure that belongs to space group FDDDZ. This compound is thus unstable in the air.

The crystal structure of $Na_4Mn_2O_5$ is rich in Na. This means that many Li atoms can be introduced into it through the aforementioned replacement reaction.

The compound of composition formula (1) also contains Na that has not been replaced.

It should be noted that Li has a smaller ionic radius than Na.

Thus, Na left in the crystal structure after the replacement of Na with Li distorts part of the crystal structure. This improves the diffusion of Li, thereby making the reactions for the insertion and removal of Li more likely to occur.

The residual Na does not move and remains in the crystal structure even when the cathode active material is oxidized or reduced. This can limit the deformation of the crystal structure associated with the insertion and removal of Li. This seems to be the reason why a high capacity is combined with a stable crystal structure.

The cathode active material according to Embodiment 1 may contain the compound as its main component.

This configuration provides a battery with a higher capacity.

The term "main component" means that the cathode active material according to Embodiment 1 contains the compound in an amount of, for example, 90% by weight or more.

The cathode active material according to Embodiment 1, when containing the compound as its main component, may further contain inevitable impurities or substances other than the main component. Such substances include starting materials for the synthesis of the compound, by-products of the synthesis of the compound, and decomposition products of the compound.

In the cathode active material according to Embodiment 1, the compound may have a composition formula (1) in which $0.18 \leq \alpha \leq 0.24$.

This configuration yields a battery with a higher capacity.

In the cathode active material according to Embodiment 1, the compound may have a composition formula (1) in which $x=0.75$, and $z=0$.

This configuration yields a battery with a higher capacity.

In the cathode active material according to Embodiment 1, the compound may have a composition formula (1) in which A represents at least one selected from the group consisting of Co, Ni, and Fe; $0.75 \leq x \leq 0.8$; $\alpha=0.22$; and $z=0.07$.

This configuration yields a battery with a higher capacity.

In the cathode active material according to Embodiment 1, the compound may have a composition formula (1) in which A represents at least one selected from the group consisting of Co, Ni, and Fe; $0.75 \leq x \leq 0.8$; $\alpha=0.22$; and $z=0.15$.

This configuration yields a battery with a higher capacity.

In the cathode active material according to Embodiment 1, the compound may have a composition formula (1) in which $0 \leq z \leq 0.07$.

This configuration yields a battery with a higher capacity.

In the cathode active material according to Embodiment 1, the compound may have a composition formula (1) in which $y=0.01$.

In the cathode active material according to Embodiment 1, the compound may have a composition formula (1) in which $\beta=0.01$.

Process for the Production of the Compound

The following describes an example of a process for producing this compound as a component of the cathode active material according to Embodiment 1.

First, $Na_4Mn_2O_5$ as a precursor is prepared.

$Na_4Mn_2O_5$ can be prepared by, for example, the following method.

A material containing Na and a material containing Mn are prepared. Examples of Na-containing materials include $Na_2O$, $Na_2O_2$, $Na_2CO_3$, and NaOH. Examples of Mn-containing materials include manganese oxides in various oxidation states such as $MnO_2$, salts such as $MnCO_3$ and $MnNO_3$, and hydroxides such as $Mn(OH)_2$ and MnOOH.

The Na-containing material and the Mn-containing material are weighed out to quantities such that the molar ratio of Na to Mn is 1.9:1 or more and 2.3:1 or less (preferably 1.95:1 or more and 2.1:1 or less).

According to a detailed study by the inventor, $Na_4Mn_2O_5$ is obtained when the molar ratio of Na to Mn is 2.0:1.

When the mixing ratio is different from 2.0:1 within the above range, $Na_4Mn_2O_5$ is obtained with $Na_2O$ as a by-product.

A precursor containing $Na_4Mn_2O_5$ and a by-product $Na_2O$ is used to replace Na with Li.

This allows "x, y, $\alpha$, and $\beta$" in composition formula (1) to be changed within the ranges specified under composition formula (1).

The scaled Na-containing material and Mn-containing material are mixed through, for example, a wet process or a dry process. This can be performed using, for example, a mixer such as a ball mill.

The resulting mixture of materials is fired. This yields a precursor that contains $Na_4Mn_2O_5$.

The atmosphere in which the mixture is fired is, for example, an inert atmosphere such as a nitrogen or argon atmosphere or a reducing atmosphere such as a mixture of nitrogen and hydrogen. The firing temperature is 500° C. or more and 800° C. or less, and the duration of firing is 6 hours or more and 24 hours or less.

An appropriate combination of raw materials and controlled mixing and firing conditions for the mixture of the raw materials provide a precursor that is substantially pure $Na_4Mn_2O_5$.

When the molar ratio of Na to Mn is 2.0 or more and less than 2.3, the resulting precursor contains $Na_2O$ and $Na_4Mn_2O_5$.

When the particles of the precursor are large, the precursor may optionally be pulverized using, for example, a ball mill.

Then Na in the $Na_4Mn_2O_5$ in the resulting precursor is replaced with Li.

The precursor is immersed in a Li-containing molten salt and allowed to stand.

The molten salt contains at least one selected from the group consisting of $LiNO_3$, LiCl, and LiOH. Preferably, the molten salt contains $LiNO_3$ and LiCl.

At least one of these lithium salts is prepared and melted by heating.

The precursor containing $Na_4Mn_2O_5$ is immersed in the melt and allowed to stand for 1 hour or more and 3 hours or less. This induces the reaction for the replacement of Na with Li.

It is preferred to maintain the molten salt at its melting point or higher temperatures for the replacement reaction.

It is preferred to maintain the molten salt at high temperatures for accelerated replacement reaction.

At temperatures much higher than 350° C., however, a change in the crystal structure of $Na_4Mn_2O_5$ would prevent the formation of the compound of composition formula (1).

When the precursor contains $Na_2O$ in addition to $Na_4Mn_2O_5$ as its main component, it is preferred that the $Na_2O$ content be 2 parts by weight per 98 parts by weight of $Na_4Mn_2O_5$.

$Na_2O$ increases the oxygen partial pressure in the molten salt. As a result, the compound of composition formula (1) is obtained.

After the precursor is allowed to stand in the molten salt, the resulting compound is, for example, washed with water.

This gives the compound of composition formula (1) a higher purity by removing unnecessary materials such as the molten salt and Na.

The composition of the resulting compound of composition formula (1) can be determined by, for example, ICP emission spectrometry.

The space group of its crystal structure is then determined by powder X-ray diffractometry. In this way, the compound of composition formula (1) can be identified.

In an aspect of Embodiment 1, therefore, the process for producing the cathode active material includes (a) providing a precursor that contains a compound represented by the composition formula $Na_4Mn_2O_5$ and (b) immersing the precursor in a lithium-containing molten salt to replace Na in the precursor with Li to obtain the cathode active material.

Step (a) may include mixing a Na-containing material and a Mn-containing material in proportions such that the molar ratio of Na to Mn is 2.0:1 or more and 2.3:1 or less to prepare a mixture of the materials.

In such a case, step (a) may include sintering the mixture of the materials.

In step (a), a Na-containing material and a Mn-containing material may be mixed in proportions such that the molar ratio of Na to Mn is 2.0:1 or more and less than 2.3:1 so that the resulting precursor will additionally contain at least one of $NaMnO_2$ and $Na_{14}Mn_2O_9$.

In step (a), the proportions in which the materials are mixed may be such that the molar ratio of Na to Mn is 2.2:1 or more and 2.25:1 or less.

In step (b), the lithium-containing molten salt may contain LiCl and $LiNO_3$.

This process for the production of a cathode active material may include, after step (b), washing the cathode active material with water.

In an aspect of Embodiment 1, the compound as a component of the cathode active material is a compound obtained by providing a precursor that contains a compound represented by the composition formula $Na_4Mn_2O_5$ and replacing Na in the precursor with Li in a lithium-containing molten salt. The precursor may further contain $Na_2O$.

A material that contains A (at least one selected from the group consisting of Co, Ni, Fe, and Al) may be used in addition to the Na-containing material and the Mn-containing material. In such a case, the precursor may contain a compound represented by $Na_4Mn_{2-\gamma}A_\gamma O_5$ ($0<\gamma<2$). By controlling the proportion of the A-containing material in the mixture, the manufacturer can change "z" in composition formula (1) within the range specified under composition formula (1). When the A-containing material is not used, z=0.

Embodiment 2

The following describes Embodiment 2. What has already been described in Embodiment 1 is omitted where appropriate.

A battery according to Embodiment 2 includes a cathode, an anode, and an electrolyte. The cathode contains a cathode active material according to Embodiment 1.

This configuration provides a high-capacity battery.

More specifically, as described in Embodiment 1, the cathode active material contains many Li atoms per Mn atom. As a result, a high-capacity battery is provided.

The battery according to Embodiment 2 can be configured as, for example, a lithium-ion secondary battery or a nonaqueous electrolyte secondary battery.

This means that, for example, the anode of the battery according to Embodiment 2 may contain an anode active material that has a property of occluding and releasing lithium.

Likewise, for example, the electrolyte of the battery according to Embodiment 2 may be a nonaqueous electrolyte (e.g., a nonaqueous liquid electrolyte). The battery according to Embodiment 2 may therefore include a nonaqueous solvent in which the electrolyte (e.g., a lithium salt) dissolves.

FIG. 1 is a cross-sectional diagram that illustrates a schematic configuration of a battery 10 as an example of a battery according to Embodiment 2.

As illustrated in FIG. 1, the battery 10 includes a cathode 21, an anode 22, a separator 14, a case 11, a top plate 15, and a gasket 18.

The separator 14 is located between the anode 21 and the cathode 22.

The cathode 21, the anode 22, and the separator 14 have been impregnated with a nonaqueous electrolyte (e.g., a nonaqueous liquid electrolyte).

The cathode 21, the anode 22, and the separator 14 form an electrode group.

The electrode group is contained in the case 11.

The case 11 is sealed with the gasket 18 and the top plate 15.

The cathode 21 includes a cathode collector 12 and a cathode active material layer 13 on the cathode collector 12.

The cathode collector 12 is made of, for example, a metallic material (e.g., aluminum, stainless steel, or an aluminum alloy).

The cathode collector 12 can be omitted and the case 11 can be used as a cathode collector.

The cathode active material layer 13 contains the cathode active material according to Embodiment 1.

The cathode active material layer 13 may optionally contain, for example, additives (e.g., a conductive agent, an ion conductor, and a binder).

The anode 22 includes an anode collector 16 and an anode active material layer 17 on the anode collector 16.

The anode collector 16 is made of, for example, a metallic material (e.g., aluminum, stainless steel, or an aluminum alloy).

The anode collector 16 can be omitted and the top plate 15 can be used as an anode collector.

The anode active material layer 17 contains an anode active material.

The anode active material layer 17 may optionally contain, for example, additives (e.g., a conductive agent, an ion conductor, and a binder).

Examples of anode active materials that can be used include metallic materials, carbon materials, oxides, nitrides, tin compounds, and silicon compounds.

The metallic materials can be pure metals or alloys. Examples of metallic materials include metallic lithium and lithium alloys.

Examples of carbon materials include natural graphite, coke, graphitizing carbon, carbon fiber, spherical carbon, artificial graphite, and amorphous carbon.

Materials preferred in terms of capacity per unit volume include silicon (Si), tin (Sn), silicon compounds, and tin compounds. The silicon compounds and the tin compounds include alloys and solid solutions.

An example of a silicon compound is $SiO_x$ (0.05<x<1.95). Compounds (alloys or solid solutions) obtained by replacing some silicon atoms in $SiO_x$ with atoms of one or more other elements can also be used. The one or more replacing elements are selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of tin compounds include $Ni_2Sn_4$, $Mg_2Sn$, $SnO_x$ (0<x<2), $SnO_2$, and $SnSiO_3$. The manufacturer can use one tin compound selected from these alone. Alternatively, the manufacturer can use a combination of two or more tin compounds selected from these.

The anode active material can be in any shape. Anode active materials in known shapes (particles, fibers, and so forth) can be used.

Any method can be used to load lithium into (or make lithium occluded in) the anode active material layer 17. Specific examples of methods include (a) depositing a layer of lithium on the anode active material layer 17 using a gas-phase process such as vacuum deposition and (b) heating a foil of metallic lithium and the anode active material layer 17 with one on the other. In both methods, heat is used to diffuse lithium into the anode active material layer 17. It is also possible to use an electrochemical process to make lithium occluded in the anode active material layer 17. In a specific example, the battery is assembled using a lithium-free anode 22 and a foil of metallic lithium (the cathode), and then the battery is charged so that lithium is occluded in the anode 22.

Examples of binders that can be used in the cathode 21 and the anode 22 include polyvinylidene fluoride, polytetrafluoroethylene, polyethylene, polypropylene, aramid resins, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene-butadiene rubber, and carboxymethylcellulose. The binder can also be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, mixtures of two or more of these binders can also be used.

Examples of conductive agents that can be used in the cathode 21 and the anode 22 include graphite, carbon blacks, conductive fibers, fluorinated graphite, metallic powders, conductive whiskers, conductive metal oxides, and organic conductive materials. Examples of forms of graphite include natural graphite and artificial graphite. Examples of carbon blacks include acetylene black, Ketjenblack®, channel black, furnace black, lamp black, and thermal black. Examples of metallic powders include an aluminum powder. Examples of conductive whiskers include zinc oxide whiskers and potassium titanium oxide whiskers. Examples of conductive metal oxides include titanium oxide. Examples of organic conductive materials include phenylenes.

The separator 14 can be a material that has a high degree of permeability to ions and a sufficiently high mechanical strength. Examples of such materials include a microporous thin film, woven fabric, and nonwoven fabric. More specifically, it is desirable that the separator 14 be made of a polyolefin such as polypropylene or polyethylene. A polyolefin-made separator 14 not only is highly durable but also provides a shutdown function when the battery is exposed to excessive heat. The thickness of the separator 14 is in the range of, for example, 10 to 300 µm (or 10 to 40 µm). The separator 14 can be a single-layer film that contains only a single material. Alternatively, the separator 14 can be a composite film (or a multilayer film) that contains two or more materials. The porosity of the separator 14 is in the range of, for example, 30% to 70% (or 35% to 60%). The term "porosity" refers to the percentage of the total volume of pores in the total volume of the separator 14. The "porosity" is measured by, for example, mercury intrusion porosimetry.

The nonaqueous liquid electrolyte contains a nonaqueous solvent and a lithium salt dissolved in the nonaqueous solvent.

Examples of nonaqueous solvents that can be used include cyclic carbonates, linear carbonates, cyclic ethers, linear ethers, cyclic esters, linear esters, and fluorinated solvents.

Examples of cyclic carbonates include ethylene carbonate, propylene carbonate, and butylene carbonate.

Examples of linear carbonates include dimethyl carbonate, ethyl methyl carbonate, and diethyl carbonate.

Examples of cyclic ethers include tetrahydrofuran, 1,4-dioxane, and 1,3-dioxolane.

Examples of linear ethers include 1,2-dimethoxyethane and 1,2-diethoxyethane.

Examples of cyclic esters include γ-butyrolactone.

Examples of linear esters include methyl acetate.

Examples of fluorinated solvents include fluoroethylene carbonate, methyl fluoropropionate, fluorobenzene, fluoroethyl methyl carbonate, and fluorodimethylene carbonate.

The manufacturer can use one nonaqueous solvent selected from these alone. Alternatively, the manufacturer can use a combination of two or more nonaqueous solvent selected from these.

The nonaqueous liquid electrolyte may contain at least one fluorinated solvent selected from the group consisting of fluoroethylene carbonate, methyl fluoropropionate, fluorobenzene, fluoroethyl methyl carbonate, and fluorodimethylene carbonate.

Adding these fluorinated solvents to the nonaqueous liquid electrolyte will make the nonaqueous liquid electrolyte more resistant to oxidation.

The improved oxidation resistance allows the battery 10 to operate in a stable manner even when charging at a high voltage.

Examples of lithium salts that can be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The manufacturer can use one lithium salt selected from these alone. Alternatively, the manufacturer can use a combination of two or more lithium salts selected from these. The concentration of the lithium salt is in the range of, for example, 0.5 to 2 mol/liter.

Batteries according to Embodiment 2 can be configured into various shapes, including coin-shaped, cylindrical, square, sheet-shaped, button-shaped, flat-plate, and multilayer batteries.

EXAMPLES

Example 1

Preparation of Cathode Active Material

MnO was pulverized using a ball mill, and the resulting powder of MnO was mixed with $Na_2O$ to give a powdered mixture of raw materials. The quantities of the raw materials were such that Na/Mn=2.15.

The resulting mixture of raw materials was tightly sealed in a nitrogen gas and fired at 540° C. This yielded a precursor.

The resulting precursor was analyzed by powder X-ray diffractometry.

Figure 2:
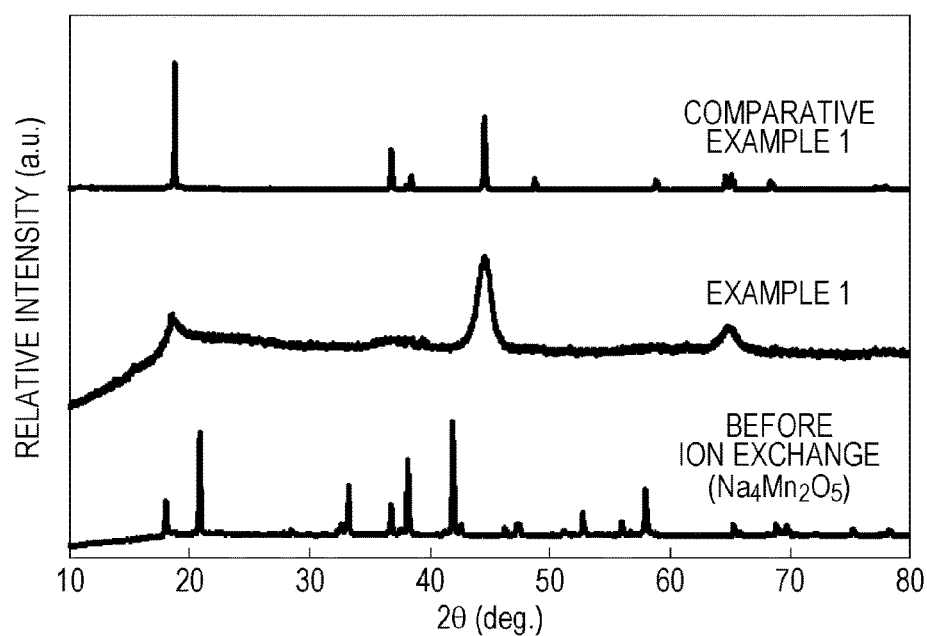
FIG. 2 illustrates powder X-ray diffraction charts of a precursor, the cathode active material of Example 1, and the cathode active material of Comparative Example 1.

The results are illustrated in FIG. 2.

The precursor contained $Na_4Mn_2O_5$ and $Na_2O$.

The molar proportion of $Na_4Mn_2O_5$ to the total amount of the precursor Was 0.99.

$LiNO_3$ and LiCl were weighed out to a molar ratio of 0.87:0.13 and a total amount of 10 g and put into an aluminum crucible.

The resulting mixture was heated with 1 g of the precursor in an air atmosphere at 280° C. for 2 hours to replace Na in the precursor with Li by ion-exchange reaction in a molten salt containing $LiNO_3$ and LiCl.

The product was washed in water. In this way, a compound for use as a cathode active material was obtained.

The resulting compound was analyzed by powder X-ray diffractometry. The results are illustrated in FIG. 2.

The space group of this compound was C2/m.

The compound was then analyzed for its composition by ICP emission spectrometry and inert gas fusion-infrared absorptiometry.

The composition of the compound was determined to be $Li_{0.76}Na_{0.01}(Li_{0.24}Na_{0.01}Mn_{0.75})O_2$.

Production of Battery

Then 70 parts by mass of the compound was mixed with 20 parts by mass of a conductive agent, 10 parts by mass of polyvinylidene fluoride (PVDF), and an appropriate amount of 2-methylpyrrolidone (NMP) to give a cathode mixture slurry.

A 20 μm thick aluminum foil for use as a cathode collector was prepared. The cathode mixture slurry was applied to one side of this cathode collector.

The cathode mixture slurry was dried and rolled. In this way, a 60 μm thick cathode plate was obtained with a cathode active material layer.

The resulting cathode plate was perforated with a 12.5 mm diameter round hole. The obtained disk was used as a cathode.

A 300 μm thick foil of metallic lithium was perforated with a 14.0 mm diameter round hole. The obtained disk was used as an anode.

Fluoroethylene carbonate (FEC), ethylene carbonate (EC), and ethyl methyl carbonate (EMC) were mixed in a volume ratio of 1:1:6 to give a nonaqueous solvent.

$LiPF_6$ was dissolved in this nonaqueous solvent to a concentration of 1.0 mol/liter to give a nonaqueous liquid electrolyte.

The resulting nonaqueous liquid electrolyte was infiltrated into a separator (Celgard, LLC.; item number 2320; a thickness of 25 μm).

Celgard® 2320 is a three-layer separator that has a polypropylene layer, a polyethylene layer, and a polypropylene layer.

The cathode, anode, and separator were assembled into a CR2032 coin-shaped battery in a moisture-proof box in which the dew point was maintained at −50° C.

Examples 2 to 10

The ratio of Na/(Mn+a transition metal oxide) was changed from that in Example 1.

The conditions under which the cathode active materials of Examples 2 to 10 were produced and the composition ratios of the synthesized cathode active materials are summarized in Table 1.

Table 1 also presents the molar proportion of $Na_4Mn_2O_5$ in the total amount of the precursor in Examples 2 to 10.

Except for this, the same procedure as in Example 1 was repeated to synthesize the cathode active materials of Examples 2 to 10. All of the compounds obtained as the cathode active materials of Examples 2 to 10 were in space group C2/m.

Coin-shaped batteries were produced using the cathode active materials of Examples 2 to 10 in the same way as in Example 1.

Comparative Example 1

$LiOH.H_2O$ and nickel-cobalt-aluminum hydroxide are mixed to give a powdered mixture of raw materials.

The resulting mixture of raw materials was fired in an air atmosphere and at 800° C. This yielded particles of lithium-nickel oxide.

The resulting cathode active material was analyzed by powder X-ray diffractometry. The results are illustrated in FIG. 2.

A coin-shaped battery was produced using these particles of lithium-nickel oxide in the same way as in Example 1.
Results of the Powder X-ray Diffractometry of the Cathode Active Materials FIG. 2 illustrates powder X-ray diffraction (XRD) charts of $Na_4Mn_2O_5$ as the precursor to the cathode active material of Example 1, the cathode active material of Example 1, and the cathode active material of Comparative Example 1.

As can be seen from FIG. 2, the XRD chart of the cathode active material of Example 1 was totally different from that of its precursor.

This indicates that replacement of Na with Li gave a compound having a crystal structure different from that of $Na_4Mn_2O_5$.

The XRD chart of the cathode active material of Example 1 was also different from that of the cathode active material of Comparative Example 1.

Evaluation of the Batteries

The battery of Example 1 was charged to a voltage of 4.9 V. The current density of the cathode was set to 0.005 mA/cm².

The battery of Example 1 was then discharged at a current density of 0.05 mA/cm² to a termination voltage of 2.0 V.

The initial discharge capacity was 314 mAh/g.

The coin-shaped batteries of Examples 2 to 10 were subjected to the measurement of capacity in the same way as that of Example 1.

The battery of Comparative Example 1 was charged to a voltage of 4.7 V. The current density of the cathode was set to 0.05 mA/cm².

The battery of Comparative Example 1 was then discharged at a current density of 0.005 mA/cm² to a termination voltage of 2.0 V.

The initial discharge capacity of the battery of Comparative Example 1 was 203 mAh/g.

The results are summarized in Table 1.

When the molar ratio of Na/(Mn+transition metal) was greater than 2.4, $0 \le \alpha \le 0.15$. In such a case, the initial discharge capacity greatly decreased.

It is therefore preferred that a meet the following condition: $0.18 \le \alpha < 0.24$.

As Table 1 demonstrates, furthermore, the initial discharge capacities of the batteries of Examples 8 to 10 were lower than those of the batteries of Examples 1 to 7.

A possible reason for this is the large z in composition formula (1) (i.e., the increased amount of the extraneous element A dissolved in the solid) and the associated elevation of impurities levels in Examples 8 to 10.

When z was greater than 0.15, $NaMnO_2$ formed as an impurity, and it greatly affected the initial discharge capacity.

It is therefore preferred that z meet the following condition: $0 \le z \le 0.15$.

Table 1 also suggests that cathode active materials with higher capacities can be provided when z meets the following condition: $0 \le z \le 0.07$.

Cathode active materials according to the present disclosure can be suitable for use with secondary and other batteries.

TABLE 1

| Sample | Molar ratio of Na/(Mn + transition metal) before firing | Molar proportion of $Na_4Mn_2O_5$ after firing | Composition after ion exchange | Initial discharge capacity (mAh/g) |
|---|---|---|---|---|
| Example 1 | 2.15 | 0.99 | $Li_{0.75}Na_{0.01}(Li_{0.24}Na_{0.01}Mn_{0.75})O_2$ | 314 |
| Example 2 | 2.10 | 0.985 | $Li_{0.75}Na_{0.01}(Li_{0.22}Na_{0.01}Mn_{0.77})O_2$ | 310 |
| Example 3 | 2.3 | 0.98 | $Li_{0.75}Na_{0.01}(Li_{0.21}Na_{0.01}Mn_{0.78})O_2$ | 298 |
| Example 4 | 2.4 | 0.975 | $Li_{0.75}Na_{0.01}(Li_{0.18}Na_{0.01}Mn_{0.81})O_2$ | 274 |
| Example 5 | 2.15 | 0.985 | $Li_{0.75}Na_{0.01}(Li_{0.22}Na_{0.01}Mn_{0.7}Co_{0.07})O_2$ | 288 |
| Example 6 | 2.15 | 0.99 | $Li_{0.75}Na_{0.01}(Li_{0.22}Na_{0.01}Mn_{0.7}Ni_{0.07})O_2$ | 286 |
| Example 7 | 2.15 | 0.98 | $Li_{0.8}Na_{0.01}(Li_{0.22}Na_{0.01}Mn_{0.7}Fe_{0.07})O_2$ | 281 |
| Example 8 | 2.15 | 0.98 | $Li_{0.78}Na_{0.01}(Li_{0.22}Na_{0.01}Mn_{0.62}Co_{0.15})O_2$ | 271 |
| Example 9 | 2.15 | 0.965 | $Li_{0.80}Na_{0.01}(Li_{0.22}Na_{0.01}Mn_{0.62}Ni_{0.15})O_2$ | 264 |
| Example 10 | 2.15 | 0.97 | $Li_{0.75}Na_{0.01}(Li_{0.22}Na_{0.01}Mn_{0.62}Fe_{0.15})O_2$ | 274 |
| Comparative Example 1 | — | — | $LiNi_{0.8}Co_{0.15}Al_{0.05}O_2$ | 203 |

As demonstrated in Table 1, the batteries of Examples 1 to 4 had initial discharge capacities of 274 to 315 mAh/g.

The initial discharge capacities of the batteries of Examples 1 to 4 were therefore higher than that of the battery of Comparative Example 1.

A possible reason for this is the use of $Na_4Mn_2O_5$, a compound that contains many Na atoms in its crystal structure, in Examples 1 to 4. Replacement of Na in this compound with Li led to successful synthesis of cathode active materials that were rich in Li per transition metal atoms.

Another possible reason is the presence of Na in the crystal structure in Examples 1 to 4. The presence of Na improved the diffusion of lithium by distorting part of the crystal structure.

Furthermore, as indicated in Table 1, the initial discharge capacities of the batteries of Examples 2 to 4 were lower than that of the battery of Example 1.

A possible reason for this is the small a in composition formula (1) (i.e., the low Li content of the transition metal layer) used in Examples 2 to 4. Reduced distortion of the crystal structure affected the diffusion of lithium.

What is claimed is:

1. A cathode active material comprising a compound represented by composition formula (1):

$$Li_xNa_y\{Li_\alpha Na_\beta Mn_{(1-\alpha-\beta-z)}A_z\}O_2 \quad (1)$$

where A represents at least one selected from the group consisting of Co, Ni, Fe, and Al, and the following conditions are met:

$0.75 \le x \le 1.0$;
$0 < y \le 0.01$;
$0.75 < x+y \le 1$;
$0.16 \le \alpha \le 0.3$;
$0 < \beta \le 0.01$;
$0.2 < \alpha+\beta \le 0.3$; and
$0 \le z \le 0.15$.

2. The cathode active material according to claim 1, wherein the compound has a crystal structure that belongs to space group C2/m.

3. The cathode active material according to claim 1, wherein the compound is a main component of the cathode active material.

4. The cathode active material according to claim 1, wherein $0.18 \leq \alpha \leq 0.24$.

5. The cathode active material according to claim 4, wherein:
x=0.75; and
z=0.

6. The cathode active material according to claim 5, wherein:
y=0.01; and
β3=0.01.

7. The cathode active material according to claim 4, wherein:
A represents at least one selected from the group consisting of Co, Ni, and Fe;
$0.75 \leq x \leq 0.8$;
α=0.22; and
z=0.07.

8. The cathode active material according to claim 4, wherein:
A represents at least one selected from the group consisting of Co, Ni, and Fe;
0.75×0.8;
α=0.22; and
z=0.15.

9. The cathode active material according to claim 1, wherein $0 \leq z \leq 0.07$.

10. A battery comprising:
a cathode containing a cathode active material;
an anode; and
an electrolyte; wherein
the cathode active material contains a compound represented by composition formula (1):

$$Li_xNa_y\{Li_\alpha Na_\beta Mn_{(1-\alpha-\beta-z)}A_z\}O_2 \qquad (1)$$

where A represents at least one selected from the group consisting of Co, Ni, Fe, and Al, and the following conditions are met:
$0.75 \leq x \leq 1.0$;
$0 < y \leq 0.01$;
$0.75 < x+y \leq 1$;
$0.16 \leq \alpha \leq 0.3$;
$0 < \beta \leq 0.01$;
$0.2 < \alpha+\beta \leq 0.3$; and
$0 \leq z \leq 0.15$.

11. The battery according to claim 10, further comprising a nonaqueous solvent in which the electrolyte dissolves, wherein
the anode contains an anode active material that has a property of occluding and releasing lithium.

* * * * *